(12) United States Patent
Gould et al.

(10) Patent No.: US 10,953,835 B2
(45) Date of Patent: Mar. 23, 2021

(54) SUPPORT FOR ROOF-MOUNTED AIRBAG

(71) Applicant: TRW Vehicle Safety Systems Inc., Washington, MI (US)

(72) Inventors: Douglas M. Gould, Lake Orion, MI (US); Tobias Klenk, Boebingen (DE); David Varcoe, Bruce Township, MI (US); Joseph C. Popek, Shelby Township, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 0 days.

(21) Appl. No.: 16/260,497

(22) Filed: Jan. 29, 2019

(65) Prior Publication Data

US 2020/0086820 A1 Mar. 19, 2020

Related U.S. Application Data

(60) Provisional application No. 62/730,581, filed on Sep. 13, 2018.

(51) Int. Cl.
| | |
|---|---|
| *B60R 21/214* | (2011.01) |
| *B60R 21/232* | (2011.01) |
| *B60R 21/02* | (2006.01) |
| *B60R 21/217* | (2011.01) |
| *B60R 21/2338* | (2011.01) |
| *B60N 2/14* | (2006.01) |
| *B60R 21/231* | (2011.01) |

(52) U.S. Cl.
CPC .......... *B60R 21/214* (2013.01); *B60R 21/232* (2013.01); *B60N 2/143* (2013.01); *B60R 21/2176* (2013.01); *B60R 21/2338* (2013.01); *B60R 2021/0253* (2013.01); *B60R 2021/23161* (2013.01); *B60R 2021/23386* (2013.01)

(58) Field of Classification Search
CPC ................ B60R 21/214; B60R 21/232; B60R 2021/0253; B60R 21/2176; B60R 2021/23386; B60R 21/2338; B60R 2021/23161; B60R 2021/23153; B60R 21/215; B60R 2021/21537; B60N 2/143
See application file for complete search history.

(56) References Cited

U.S. PATENT DOCUMENTS

| | | | | |
|---|---|---|---|---|
| 5,685,930 | A | * | 11/1997 | Gallagher ........... B29C 37/0085 156/73.1 |
| 7,918,480 | B2 | | 4/2011 | Kwon et al. |
| 8,002,309 | B2 | | 8/2011 | Kim et al. |
| 8,262,130 | B2 | | 9/2012 | Fischer et al. |
| 8,544,883 | B2 | | 10/2013 | Fischer et al. |

(Continued)

*Primary Examiner* — Drew J Brown
(74) *Attorney, Agent, or Firm* — Tarolli, Sundheim, Covell & Tummino LLP

(57) ABSTRACT

A module for a vehicle including a roof and a cabin includes a housing defining a chamber and having an opening in fluid communication with the chamber. The housing is configured for placement in the roof. An airbag is provided in the chamber and is inflatable to a deployed condition extending through the opening into the cabin. A door pivotably connected to the housing closes the opening. The door is pivotable away from the roof in response to deployment of the airbag to provide a reaction surface for the deploying airbag. The door has a first length while closing the opening and a second length greater than the first length when pivoted away from the roof.

19 Claims, 7 Drawing Sheets

(56) References Cited

U.S. PATENT DOCUMENTS

| | | |
|---|---|---|
| 8,764,058 B2 | 7/2014 | Fischer et al. |
| 9,174,603 B2 | 11/2015 | Fischer et al. |
| 9,533,650 B2 | 1/2017 | Lenorcy et al. |
| 9,676,361 B2 | 6/2017 | Smith et al. |
| 9,725,064 B1 | 8/2017 | Faruque et al. |
| 2004/0075251 A1* | 4/2004 | Fujii .................. B60R 21/2165 280/728.3 |
| 2014/0151983 A1* | 6/2014 | Schupbach ........... B60R 21/215 280/728.3 |
| 2018/0222432 A1 | 8/2018 | Schneider |
| 2019/0161048 A1 | 5/2019 | Thomas et al. |
| 2019/0161049 A1 | 5/2019 | Thomas et al. |

* cited by examiner

SUPPORT FOR ROOF-MOUNTED AIRBAG

RELATED APPLICATIONS

This application claims the benefit of U.S. Provisional Appln. Ser. No. 62/730,581, filed Sep. 13, 2018, the entirety of which is incorporated herein by reference.

TECHNICAL FIELD

The present invention relates generally to vehicle airbags and, in particular, relates to a support structure for a roof-mounted airbag.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one example, a module for a vehicle having a roof and a cabin includes a housing defining a chamber and an opening in fluid communication with the chamber. The housing is configured for placement in the roof. An airbag is provided in the chamber and is inflatable to a deployed condition extending through the opening into the cabin. A door pivotably connected to the housing closes the opening. The door is pivotable away from the roof in response to deployment of the airbag to provide a reaction surface for the deploying airbag. The door has a first length while closing the opening and a second length greater than the first length when pivoted away from the roof.

In another example, a module for a vehicle having a roof and a cabin includes a housing defining a chamber and an opening in fluid communication with the chamber. The housing is configured for placement in the roof. An airbag is provided in the chamber and is inflatable to a deployed condition extending through the opening into the cabin. A door pivotably connected to the housing closes the opening. The door has telescoping segments and is pivotable away from the roof in response to deployment of the airbag to provide a reaction surface for the deploying airbag. The door has a first length while closing the opening and a second length greater than the first length when pivoted away from the roof. A tether is connected to the door and the airbag for pulling the airbag towards the door during airbag deployment.

Other objects and advantages and a fuller understanding of the invention will be had from the following detailed description and the accompanying drawings.

DETAILED DESCRIPTION

Figure 1:
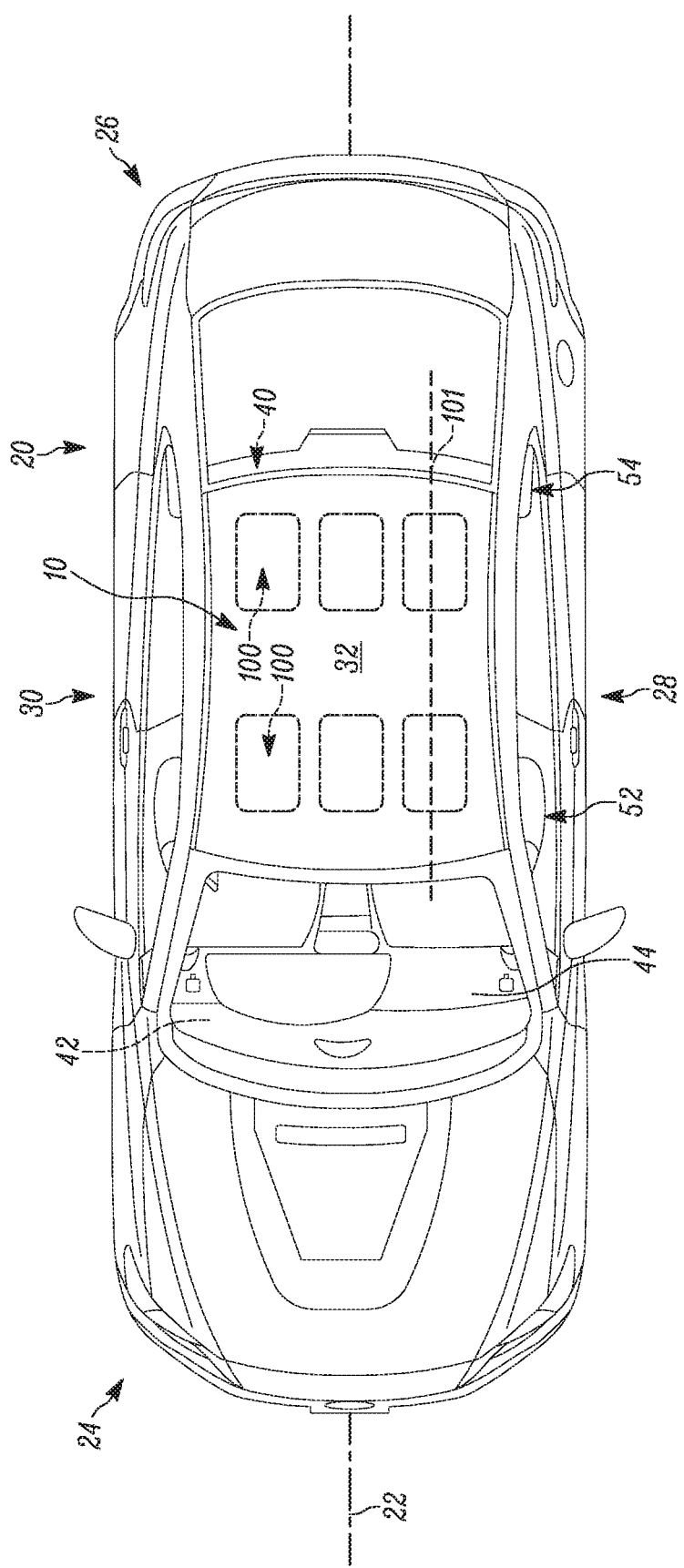
FIG. 1 is a top view of a vehicle including an example roof-mounted, occupant restraint including having an airbag module.
Figure 2:
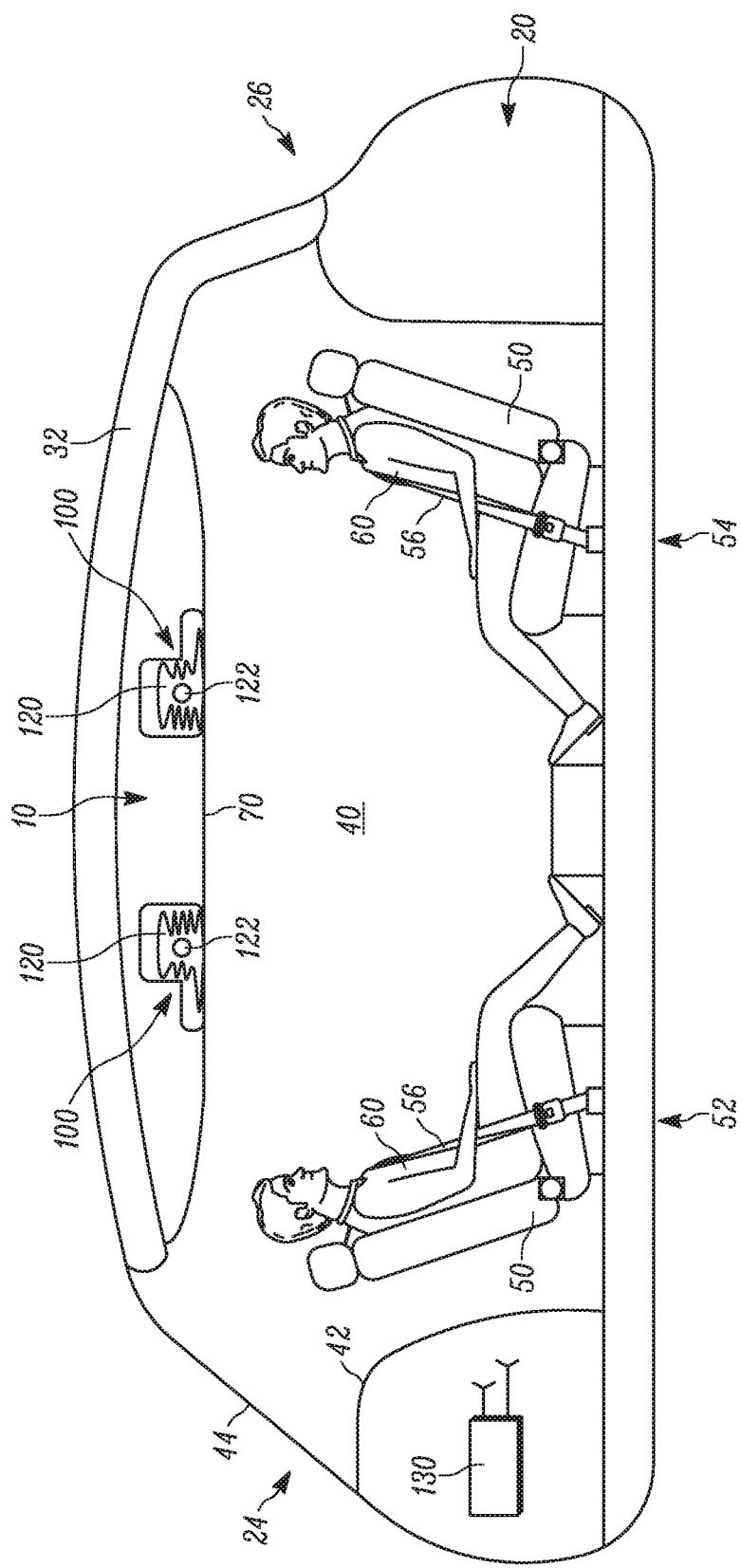
FIG. 2 is a schematic illustration of a cabin of the vehicle with the airbags of the restraint system in a first, stored condition.

The present invention relates generally to vehicle airbags and, in particular, relates to a support structure for a roof-mounted airbag. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 includes a seatback 51 and is fitted with a seatbelt 56 for restraining its occupant 60. The occupant 60 faces away from the seatback 51. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one airbag module 100 for placement along the roof 32 of the vehicle 20. Each airbag module 100 includes a vehicle occupant protection device in the form of an inflatable curtain airbag 120 and an inflator 122 for providing inflation fluid to the airbag.

Mounting airbag modules 100 in the vehicle roof 32 is convenient because the airbags can be positioned in a location with a desired proximity to the occupant(s) 60 they are intended to help protect. This can help reduce the necessary inflatable volume of the airbags and can also help provide a desired airbag deployment time without requiring an excessively high-volume inflator. The airbag modules 100 are housed/concealed in the roof structure of the vehicle 20 behind, for example, a roof liner 70. The airbag 120 is at least one of rolled and folded before being placed in the airbag module 100 behind the roof liner 70.

The inflators 122 are operatively connected (e.g., by wires) to an airbag controller 130 (see FIG. 2) that includes or communicates with one or more crash sensors (not shown). The airbag controller 130 is operative to determine the occurrence of a crash event and to actuate the inflators 122 in a known manner to inflate the airbags 120. The inflators 122 can be of any known type, such as stored gas, solid propellant, augmented or hybrid.

The airbags 120 can be constructed of any suitable material, such as nylon (e.g., woven nylon 6-6 yarns), and may be constructed in any suitable manner. For example, the primary airbag 70 may include one or more pieces or panels of material. If more than one piece or panel is used, the pieces or panels can be interconnected by known means, such as stitching, ultrasonic welding, heat bonding, or adhesives, to form the airbags 120. The airbags 120 can be uncoated, coated with a material, such as a gas impermeable urethane, or laminated with a material, such as a gas impermeable film. The airbags 120 can therefore have a gas-tight or substantially gas-tight construction. Those skilled in the art will appreciate that alternative materials, such as polyester yarn, and alternative coatings, such as silicone, may also be used to construct the airbags 120.

The occupant restraint system 10 can include multiple airbag modules 100 provided along the roof 32 and within the roof liner 70 at locations associated and aligned with each seat 50 in each row 52, 54. In other words, each seat 50 in the vehicle 20 can have an individual airbag module 100 associated therewith and, thus, each seat can have an individual airbag 100 (and corresponding inflator 122) associated and aligned therewith.

Multiple airbag modules 100 are aligned with one another along a first line parallel to and rearward of the front row 52 with centerlines 101 extending perpendicular to the first line. Multiple airbag modules 100 are also aligned with one another along a second line parallel to and forward of the rear row 54 with the centerlines 101 extending perpendicular to the second line. In each case, the row of modules 100 is positioned in front of the row 52 or 54 of seats 50 in the direction the occupants 60 in those seats would face (i.e., rearward of the front row and forward of the rear row).

Figure 3A:
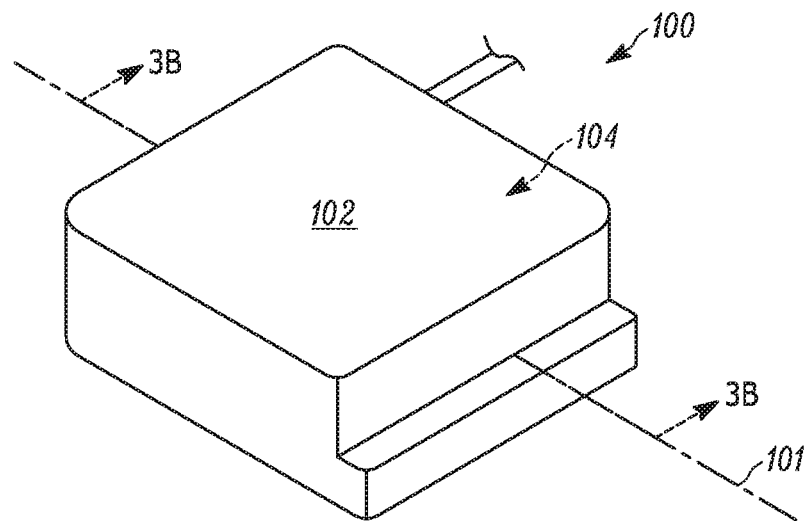
FIG. 3A is a side view of the airbag module of FIG. 1.
Figure 3B:
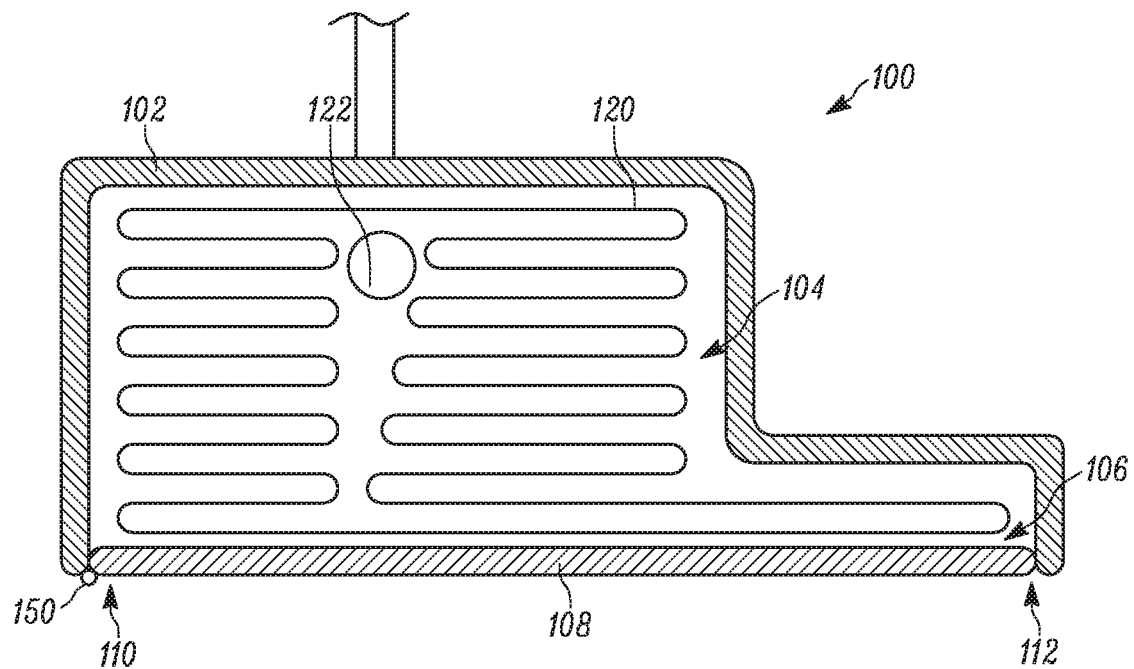
FIG. 3B is a section view taken along line 3B-3B of FIG. 3A.

Referring further to FIGS. 3A-3B, each module 100 can be generally rectangular or have another geometric shape. In any case, the module 100 extends along the centerline 101 and includes a housing 102 defining a chamber 104. An opening 106 extends through the housing 102 and is in fluid communication with the chamber 104. The airbag 120 is at least one of rolled and folded before being stored within the chamber 104. A door 108 extends from a first end 110 connected to the housing 102 to a second end 112. In one example, a hinge 150 pivotably connects the first end 110 to the housing 102.

The door 108 has an initial condition closing the opening 106 and cooperating with the housing 102 to enclose the airbag 120 within the chamber 104. The door 108 can be a separate component connected to the housing 102 and distinct from the roof liner 70 (as shown) or form part of the roof liner 70 (not shown). In any case, the airbag modules 100 are identical and, thus, the construction and operation of only the airbag module associated with one seat 50 in each row 52, 54 is discussed for brevity.

Figure 4:
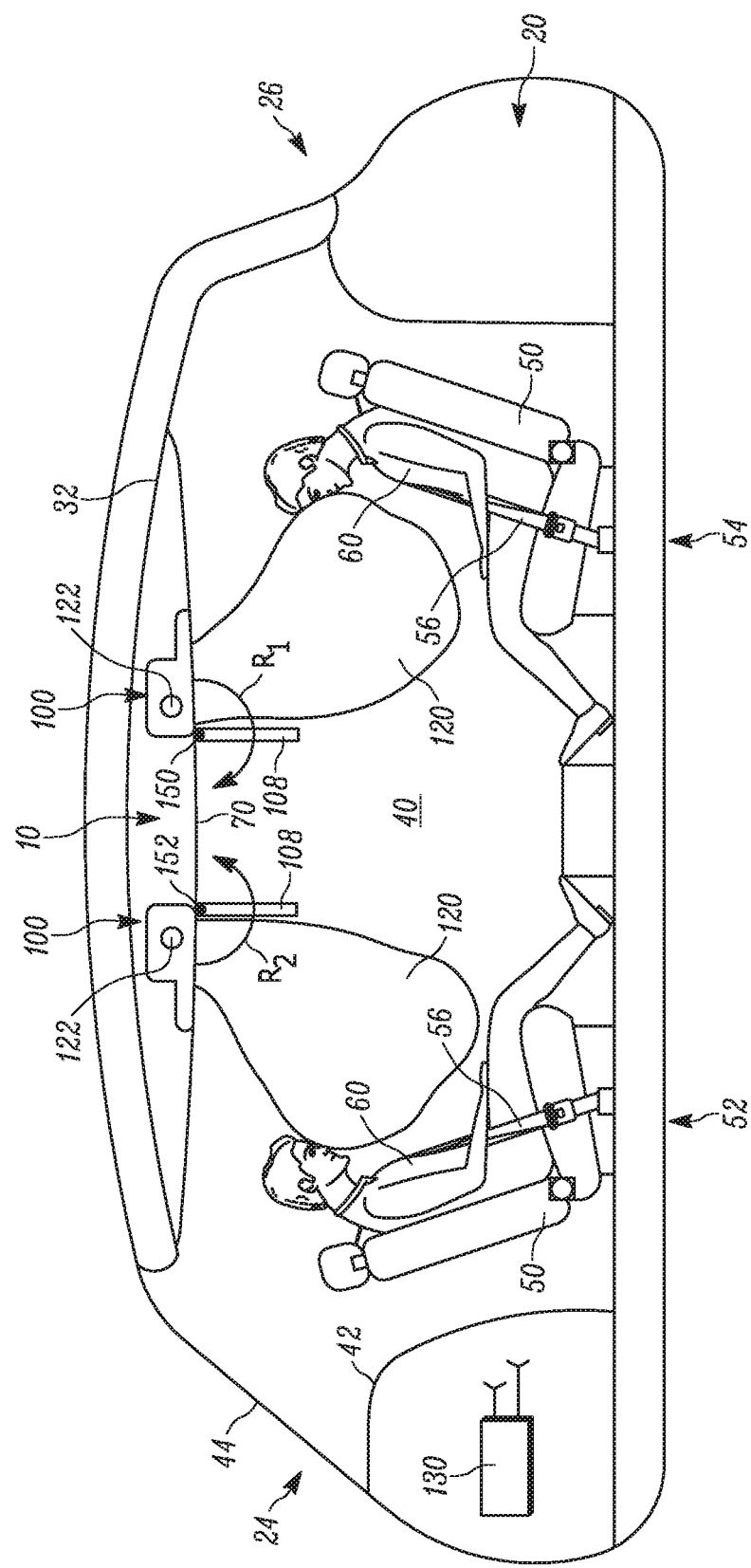
FIG. 4 is a schematic illustration of the cabin of the vehicle with the airbags of the restraint system in a second, deployed condition.

As shown in FIG. 4, upon sensing the occurrence of an event for which inflation of the airbag 120 is desired, such as a vehicle collision, the controller 130 provides a signal to one of the inflators 122. More specifically, the controller 130 actuates the inflator 122 associated with front row 52 in response to a rear vehicle collision and actuates the inflator associated with rear row 54 in response to a front vehicle collision. That said, although FIG. 4 illustrates airbags 120 associated with both rows 52, 54 inflated and deployed it will be appreciated that only one will be deployed based on the aforementioned collision directions.

Upon receiving the signals from the controller 130, the inflators 122 are actuated and provide inflation fluid to the inflatable volumes of the airbags 120 in a known manner. The inflating airbags 120 exert a force on their respective doors 108, which causes the doors to move to an open condition. This releases the airbags 120 to inflate from their stored conditions in their respective housings 102 to deployed conditions within the cabin 40. The airbags 120, while inflated, help protect the vehicle occupants 60 by absorbing the impact of the occupants.

Regarding the modules 100 associated with the rear row 54 of seats 50, each deploying airbag 120 forces the associated door 108 to pivot about the hinge 150 in the direction indicated generally at $R_1$ away from the occupants 60 in the rear row. This pivoting allows each airbag 120 to deploy downward (as shown) towards the associated seat 50 in the rear row 54 and forward of the occupant 60 in that seat.

Deployment of the airbag 120 towards the rear row 54 is limited by the pivoted door 108. More specifically, the hinge 150 connection between the door 108 and the housing 102 is such that the door pivots a predetermined degree before stopping and providing a reaction surface for the deploying airbag 120. This helps ensure each airbag 120 deploys in the prescribed manner in front of the associated forward-facing occupant 60 in the rear row 54. In one example, the door 108 pivots about 90° in the manner $R_1$ from the initial condition closing the opening 106. The hinge 150 strength can be increased or decreased in order to provide the desired degree of resistance to the deploying airbag 120.

Similarly, with each module 100 associated with the front row 52, each deploying airbag 120 forces the associated door 108 to pivot in the direction indicated generally at $R_2$ away from the occupants 60 in the front row 52. More specifically, the door 108 pivots about a hinge 152 connecting the first end 110 to the housing 102. The hinge 152 is identical to the hinge 150 but given a different reference numeral for clarity. In any case, this pivoting allows each airbag 120 to deploy downward (as shown) towards the associated seat 50 in the front row 52 and rearward of the occupant 60 in that seat.

Deployment of the airbag 120 towards the front row 52 is limited by the pivoted door 108. More specifically, the connection between the door 108 and the housing 102 is such that the door pivots a predetermined degree before stopping and providing a reaction force/surface to the deploying airbag 120. This helps ensure each airbag 120 deploys in the prescribed manner in front of the associated rearward-facing occupant 60 in the front row 52. In one example, the door 108 pivots about 90° in the manner $R_2$ from the initial condition closing the opening 106. The hinge 152 strength can be increased or decreased in order to provide the desired degree of resistance to the deploying airbag 120.

In both situations, the doors 108 and hinges 150, 152 cooperate to supply a reaction surface for the deploying airbag 120 in lieu of the reaction surface normally supplied by the existing vehicle architecture (e.g., instrument panel or windshield). It will be appreciated that the door can alternatively be formed by a portion of the roof 32, roof liner 70 or header of the vehicle 20 (not shown) instead of being a separate component. The door can also be secured to and pivotable about the roof liner 70 or header. In another example construction, the hinges 150, 152 can be reinforced (not shown) to limit pivotal movement of the door in the manner $R_1$.

Figure 5:
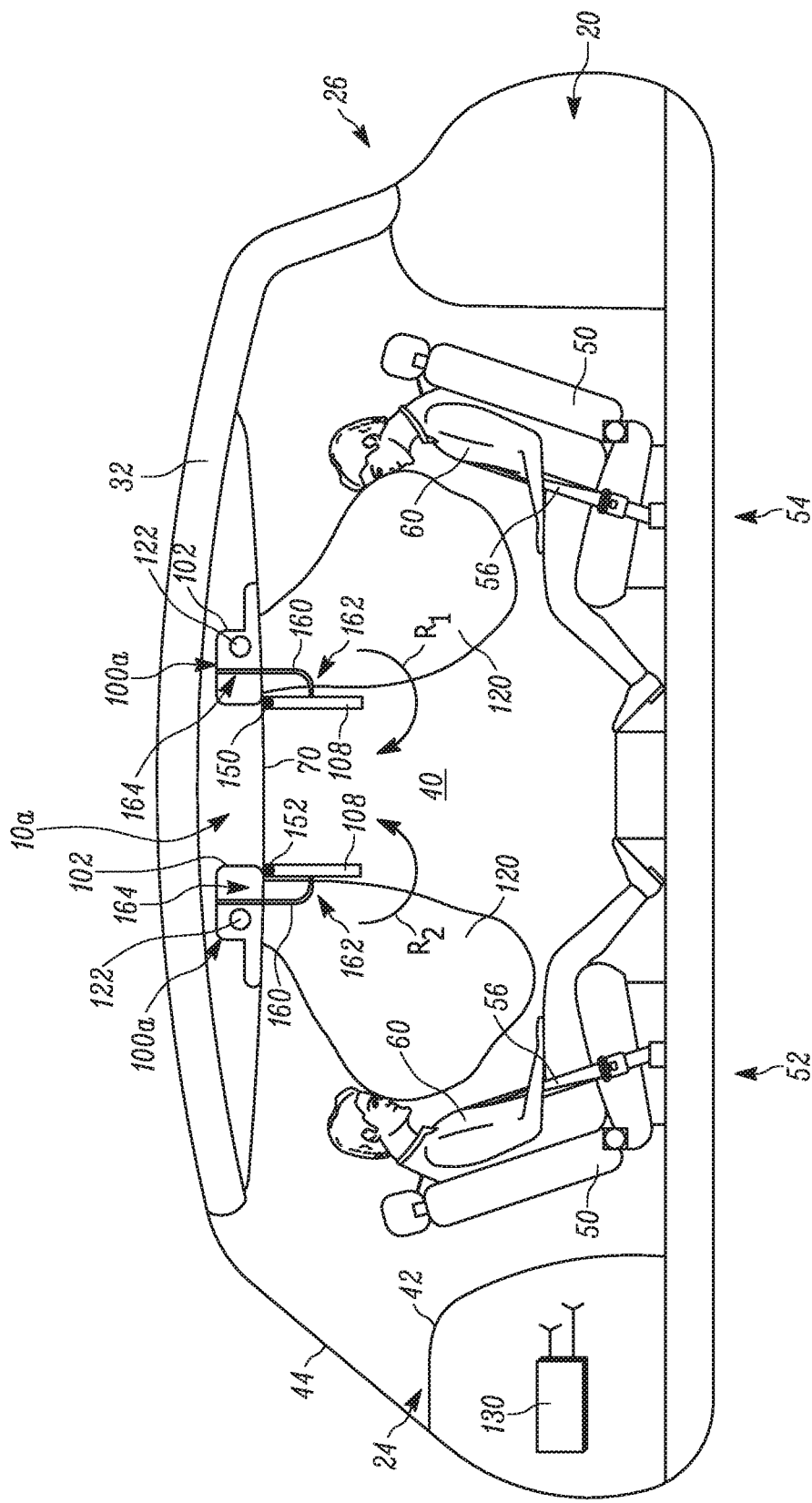
FIG. 5 is a schematic illustration of another example restraint system including a strap.

In another example shown in FIG. 5, each module 100a in the occupant restraint system 10a includes an inextensible tether or strap 160 having a first end 162 and a second 164. The first end 162 is secured to the door 108 and the second end 164 is secured to the housing 102. The strap 160 could alternatively be secured to the roof liner 72 (not shown).

Regardless, the strap 160 limits pivotal movement of the door 108 in the manner $R_1$ (for the modules 100a associated with the rear row 54) or the manner $R_2$ (for the modules associated with the front row 52). In one example, the door 108 is limited to about 90° of pivotal movement in the manner $R_1$ or $R_2$. The length and attachment points of the straps 160 can be configured to limit pivotal movement of the doors 108 such that the airbags 120 deploy in the prescribed manner. In other words, the doors 108 act as reaction surfaces for the deploying airbags 120.

Figure 6:
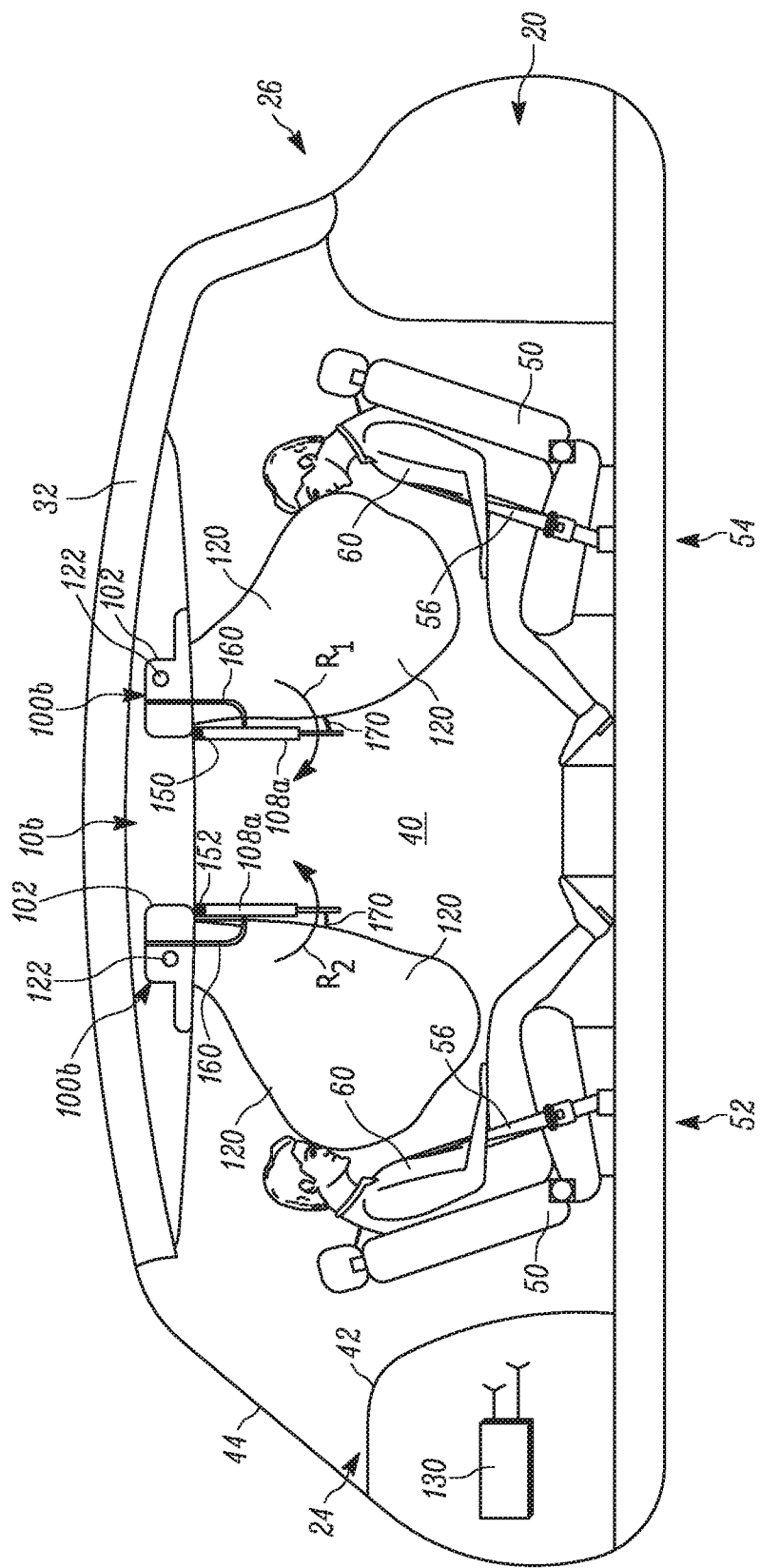
FIG. 6 is a schematic illustration of another example restraint system including a telescoping door and a tether.
Figure 7A:
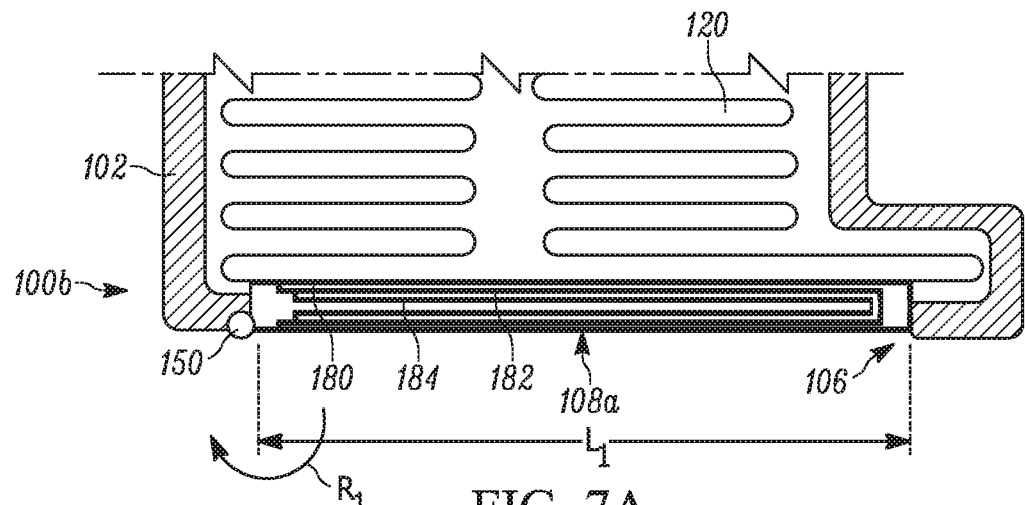
FIGS. 7A-7B further illustrate the telescoping door of the airbag module of FIG. 6.
Figure 7B:
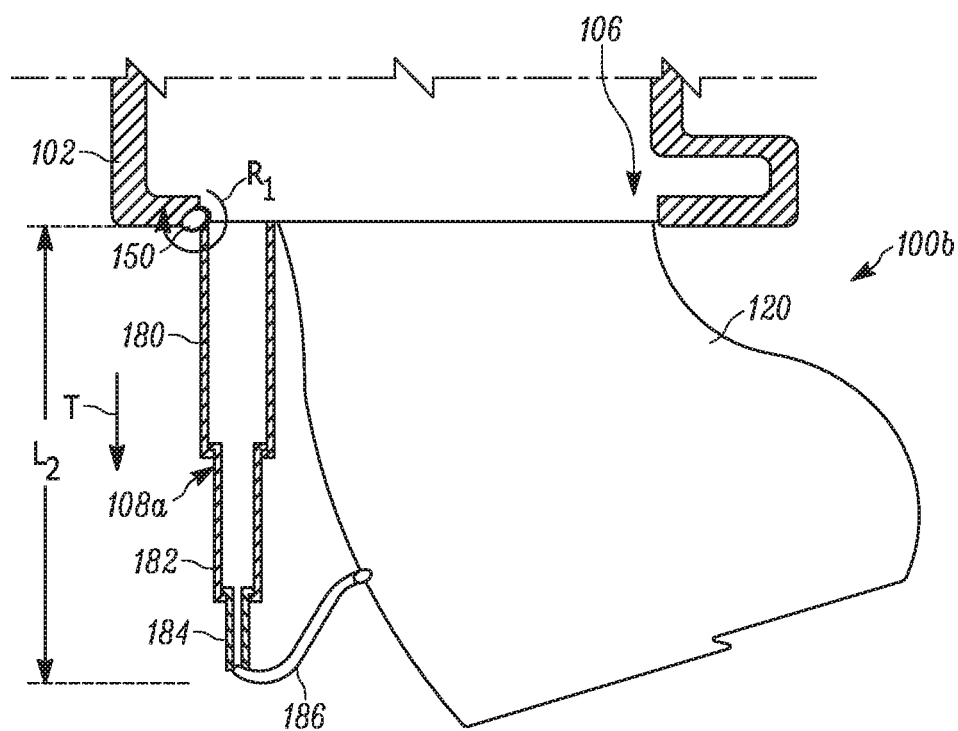

In another example occupant restraint system 10b shown in FIGS. 6-7B, the door is a telescoping door 108a formed from multiple, telescoping tubes or segments 180, 182, 184. The door 108a is initially in a collapsed condition (FIG. 7A) covering the opening 106 in the housing 102 prior to deployment of the airbag 120. In this condition, the tubes 180, 182, 184 are nested within one another such that the tubes 182, 184 do not extend longitudinally beyond the end of the tube 180.

When the airbag 120 deploys to cause pivoting of the door 108a in the manner $R_1$ or $R_2$, the tubes 180, 182, 184 automatically telescope outwards in the manner T to an extended condition. In other words, the door 108a has a first length $L_1$ when in the collapsed condition and a second length $L_2$ greater than the first length when the door reaches the extended condition. Consequently, the extended door 108a is larger/longer than the opening 106 in the housing 102. This allows the extended door 108a to provide a longer reaction surface for the deploying airbag 120 and thereby further help direct the direction of deployment.

An optional tether 186 can be secured to the last tube 184 and to the airbag 120. The tether 186 pulls the deploying airbag 120 towards the door 108a. The door 108a and tether 186 therefore cooperate to control deployment of the airbag 120. It will be appreciated, however, that the tether 186 can be omitted (not shown) such that the extended door 108a acts alone to provide the reaction surface for the deploying airbag 120. Moreover, the tether 186 could alternatively be secured to the door 108a and the module 100b or to the door and the vehicle 20 for limiting pivotal movement of the door 108a in the manner $R_1$.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. For example, it will be appreciated that any combination of the reinforced hinge, strap, tether, and/or telescoping door can be used to provide a reaction surface for the airbag as it deploys from the airbag module, through the roof, and towards the vehicle occupant.

What is claimed is:

1. A module for a vehicle including a roof and a cabin, comprising:
    a housing defining a chamber and including an opening in fluid communication with the chamber, the housing being configured for placement in the roof;
    an airbag provided in the chamber and being inflatable to a deployed condition extending through the opening into the cabin; and
    a door pivotably connected to the housing for closing the opening, the door being pivotable away from the roof in response to deployment of the airbag to provide a reaction surface for the deploying airbag, the door comprising telescoping segments that extend in response to pivoting movement of the door such that the door has a first length while closing the opening and a second length greater than the first length when pivoted away from the roof.

2. The module recited in claim 1, wherein the door, when pivoted, directs the airbag towards a vehicle occupant in the cabin.

3. The module recited in claim 1 further comprising a strap secured to the module and the door for limiting pivoting of the door during airbag deployment.

4. The module recited in claim 1, wherein the door extends from a first end to a second end, a hinge connecting the first end to the housing for limiting the degree to which the door pivots.

5. The module recited in claim 4, wherein the hinge is reinforced.

6. The module recited in claim 4 further comprising a strap secured to the module and the door for limiting the degree to which the door pivots during airbag deployment.

7. The module recited in claim 1, wherein the airbag deploys rearward of an occupant facing in a rearward direction of the vehicle.

8. The module recited in claim 1, wherein the segments are nested within one another while the door closes the opening.

9. The module recited in claim 1 further comprising a strap connected to the module and the door for limiting the degree to which the door pivots during airbag deployment.

10. The module recited in claim 1, wherein the door is formed as part of a roof liner or header of the vehicle.

11. The module recited in claim 1, wherein the door is pivotable about a roof liner or header of the vehicle.

12. The module recited in claim 1, wherein the door is formed as part of a roof liner or header of the vehicle.

13. The module recited in claim 1, wherein the door is pivotable about a roof liner or header of the vehicle.

14. A module for a vehicle including a roof and a cabin, comprising:
    a housing defining a chamber and including an opening in fluid communication with the chamber, the housing being configured for placement in the roof;
    an airbag provided in the chamber and being inflatable to a deployed condition extending through the opening into the cabin;
    a door pivotably connected to the housing for closing the opening, the door being pivotable away from the roof in response to deployment of the airbag to provide a reaction surface for the deploying airbag, the door having a first length while closing the opening and a second length greater than the first length when pivoted away from the roof; and
    a tether connected to the door and the airbag for pulling the airbag towards the door during airbag deployment.

15. A module for a vehicle including a roof and a cabin, comprising:
    a housing defining a chamber and including an opening in fluid communication with the chamber, the housing being configured for placement in the roof;
    an airbag provided in the chamber and being inflatable to a deployed condition extending through the opening into the cabin;
    a door pivotably connected to the housing for closing the opening, the door comprising telescoping segments and being pivotable away from the roof in response to deployment of the airbag to provide a reaction surface for the deploying airbag, the door having a first length while closing the opening and a second length greater than the first length when pivoted away from the roof; and
    a tether connected to the door and the airbag for pulling the airbag towards the door during airbag deployment.

16. The module recited in claim 15, wherein the door, when pivoted, directs the airbag towards a vehicle occupant in the cabin.

17. The module recited in claim 15, wherein the door extends from a first end to a second end, a hinge connecting the first end to the housing for limiting the degree to which the door pivots.

18. The module recited in claim 17, wherein the hinge is reinforced.

19. The module recited in claim 15, wherein the airbag deploys rearward of an occupant facing in a rearward direction of the vehicle.

* * * * *